(12) United States Patent
Ueno et al.

(10) Patent No.: US 9,199,662 B2
(45) Date of Patent: Dec. 1, 2015

(54) RACK AND PINION STEERING GEAR UNIT

(75) Inventors: Seiji Ueno, Gunma (JP); Toshiyuki Arai, Gunma (JP); Ryota Sugihara, Gunma (JP)

(73) Assignee: NSK LTD, Tokyo (JP)

( * ) Notice: Subject to any disclaimer, the term of this patent is extended or adjusted under 35 U.S.C. 154(b) by 0 days.

(21) Appl. No.: 13/574,459

(22) PCT Filed: Apr. 24, 2012

(86) PCT No.: PCT/JP2012/060934
§ 371 (c)(1),
(2), (4) Date: Oct. 9, 2012

(87) PCT Pub. No.: WO2012/147724
PCT Pub. Date: Nov. 1, 2012

(65) Prior Publication Data
US 2013/0074621 A1    Mar. 28, 2013

(30) Foreign Application Priority Data

Apr. 25, 2011 (JP) .................. 2011-096717
May 20, 2011 (JP) .................. 2011-113242

(51) Int. Cl.
*F16H 19/08* (2006.01)
*B62D 3/12* (2006.01)

(52) U.S. Cl.
CPC ............. *B62D 3/12* (2013.01); *Y10T 74/18096* (2015.01)

(58) Field of Classification Search
CPC ............ B62D 5/22; B62D 3/12; B62D 17/00; F16H 19/04
USPC ........ 74/30, 10.39, 29, 388 PS; 180/426, 425
See application file for complete search history.

(56) References Cited

U.S. PATENT DOCUMENTS 4,421,191 A * 12/1983 Bertin et al. .................. 180/417
4,522,419 A *  6/1985 Yoshida et al. .......... 280/93.515

(Continued)

FOREIGN PATENT DOCUMENTS

DE        3633336 A1    4/1988
DE       19523568 A1    1/1996

(Continued)

OTHER PUBLICATIONS

International Search Report dated May 22, 2012, from corresponding International Application No. PCT/JP2012/060934.

(Continued)

*Primary Examiner* — William Kelleher
*Assistant Examiner* — Zakaria Elahmadi
(74) *Attorney, Agent, or Firm* — Katten Muchin Rosenman LLP

(57) ABSTRACT

A lightweight and low cost gear housing for a steering gear unit is achieved. Together with forming an outward-facing flange shaped convex engagement section 43 around the middle section in the axial direction of a rack shaft 40, a gear housing is constructed that comprises a pinion-side housing 10, a non-pinion-side housing 20, and an intermediate cylindrical section 30. As a result, movement of the rack shaft 40 toward the pinion side and the non-pinion side is restricted by both ends of the pinion-side housing 10. Therefore, portions that require large strength can be limited to the pinion-side housing 10 that is short in the width direction of the vehicle, so by reducing the wall thickness of the intermediate cylindrical section 30, or by making the intermediate cylindrical section 30 using a flexible material, it is possible to make the member lightweight, as well as processing become easier, so it becomes possible to reduce the manufacturing cost.

8 Claims, 12 Drawing Sheets

(56) References Cited

U.S. PATENT DOCUMENTS

| | | | |
|---|---|---|---|
| 4,819,499 A * | 4/1989 | Morell | 74/498 |
| 4,827,788 A | 5/1989 | Beer et al. | |
| 6,053,273 A * | 4/2000 | Shimizu et al. | 180/444 |
| 6,390,230 B1 * | 5/2002 | Shimizu et al. | 180/444 |
| 7,367,421 B2 * | 5/2008 | Saito et al. | 180/426 |
| 7,461,571 B2 * | 12/2008 | Tanaka | 74/388 PS |
| 7,780,176 B2 * | 8/2010 | Ohara et al. | 280/93.514 |
| 8,240,424 B2 * | 8/2012 | Krinke et al. | 180/426 |
| 2008/0224434 A1 | 9/2008 | Ohara et al. | |
| 2010/0251839 A1 * | 10/2010 | Kim et al. | 74/29 |

FOREIGN PATENT DOCUMENTS

| | | | |
|---|---|---|---|
| DE | 102008000761 A1 | | 9/2009 |
| EP | 1970290 A1 | | 9/2008 |
| GB | 2290761 A | | 1/1996 |
| JP | 59-102477 | | 7/1984 |
| JP | 61-129670 | | 6/1986 |
| JP | 1-167963 | | 11/1989 |
| JP | 2005-96591 | | 4/2005 |
| JP | 2007-50808 | | 3/2007 |
| JP | 2009-29225 | | 2/2009 |
| JP | 2009-29225 A | | 2/2009 |
| JP | 2009029225 A | * | 2/2009 |
| JP | 2009-56827 | | 3/2009 |

OTHER PUBLICATIONS

Extended European Search Report, dated Jul. 1, 2015 for the Corresponding European Patent Application No. 12734776.3.

* cited by examiner

RACK AND PINION STEERING GEAR UNIT

TECHNICAL FIELD

The present invention relates to a rack and pinion steering gear unit of a steering apparatus for applying a steering angle to steered wheels of an automobile.

BACKGROUND ART

A rack and pinion steering gear unit is used as a mechanism for converting rotating motion that is input from a steering wheel to linear motion for applying a steering angle. Steering apparatuses that comprise a rack and pinion steering gear unit are well known, and have been disclosed for example in JP61-129670(U), JP2005-96591(A) and JP2009-56827(A). FIG. 14 illustrates construction of an example of a steering apparatus in which a rack and pinion steering gear unit is assembled. In this steering apparatus, in order to reduce the operating force for operating the steering wheel 101, auxiliary steering force from a motor 102 that is installed in the middle of the steering column 195 is applied to the steering shaft. The movement of the steering shaft that rotates as the steering wheel 101 is operated is transmitted to an intermediate shaft 106, which causes a rack shaft of a rack and pinion steering gear unit 103 to reciprocate by way of a pinion shaft 107, and this steers the steered wheels by way of tie rods 104.

As illustrated in FIG. 15, the steering gear unit 103 comprises a rack shaft 109 and a gear housing 110 that houses the rack shaft 109 so as to be able to displace in the axial direction therein. The gear housing 110 is integrally formed by performing die casting of a metal such as an aluminum alloy. By making the gear housing 110 using metal in this way, it is possible to receive the steering reaction force that is transmitted from the wheels when steering. The gear housing 110 has a cylindrical shaped main housing section 111 that is open on both ends in the lengthwise direction, and a sub housing section 112 that is provided on the outer circumferential surface of the portion near one end in the lengthwise direction of the main housing section 111, and has a center axis that is in twisted position relationship with the center axis of the main housing section 111. The internal spaces of the main housing section 111 and the sub housing section 112 are connected with each other. The gearing housing 110 is supported by and fastened to the vehicle body (frame) by bolts or studs that are inserted through a pair of installation flanges 113 that are provided at two locations around the outer circumferential surface of the main housing section 111 that are separated in the axial direction.

The rack shaft 109 comprises rack teeth that are formed on the part of the side surface in the axial direction. Except for the portion where the rack teeth are formed, the rack shaft 109 is a circular rod shape with the outer circumferential surface thereof being a cylindrical surface. With pinion teeth that are formed on the tip end section of the pinion shaft 107 engaged with the rack teeth of the rack shaft 109, the pinion shaft 107 is supported by the sub housing section 112 so as to be able to rotate. A cylinder section 108 that is equipped with a pressing block is provided on the portion in the radial direction of the main housing section 111 on the opposite side from the sub housing section 112.

In this kind of rack and pinion steering gear unit, construction is such that when the operator operates the steering wheel 101, the rack shaft 109 moves in the axial direction, and when reaching the stroke end, ball joint sockets 114 that are fastened to both ends of the rack shaft 109 in the width direction of the vehicle come in contact with the both ends of the main housing section 111 of the gear housing 110 in the width direction of the vehicle, and as a result, movement of the rack shaft 109 is stopped, and the movement distance of the rack shaft 109 is limited.

In the case of this kind of construction, the length of the gear housing 110 in the width direction of the vehicle becomes long due to the wide space in the width direction of the vehicle between the ball joint sockets 114 that are fastened on both ends of the rack shaft 109. Therefore, the thrust load when the ball joint sockets 114 come in contact with the both ends of the main housing section 111 of the gear housing 110 is supported by these both ends of the gear housing 110 that is long in the width direction of the vehicle, so it is necessary that the gear housing 110 have large strength. In order for that, the gear housing 110 must be formed using metal material having large rigidity, and the thickness of the gear housing 110 must be thick. As a result, there are problems in that the weight of the gear housing 110 increases and the manufacturing cost increases.

Furthermore, because the rack shaft 109 is long in the axial direction, there is a problem in that when integrally forming the gear housing 110 by casting, the material cost and processing cost increases.

JP61-129670(A), JP2009-56827 and JP2005-96591 disclose construction wherein the steering gear housing is divided into two or more members. Moreover, JP2005-96591 (A) discloses construction wherein the gear housing is divided into three parts, left and right mounting sections that are mounted to the vehicle body, and a middle section; and of these, the left and right mounting sections are formed of an aluminum material, and the middle section is made of a steel material. With this kind of construction, the length in the axial direction of the left and right mounting sections is shorter than the length in the axial direction of the integrated gear housing, so casting work becomes easier, as well as other processing also becomes easier. However, even in the case of construction wherein the gear housing is divided, thrust load when the boll joint sockets come in contact with the gear housing is supported by both ends of the gear housing in the axial direction of the vehicle, so the gear housing still must have large strength. In order for this, it is necessary that the thickness of the gear housing be thick, and gear housing must be made of a metal material having large strength. As a result, it is not possible to solve the problem of increased weight and increased manufacturing cost of the gear housing.

RELATED LITERATURE

Patent Literature

[Patent Literature 1] JP61-129670(A)
[Patent Literature 2] JP2009-56827(A)
[Patent Literature 3] JP2005-96591(A)

SUMMARY OF THE INVENTION

Problem to be Solved by the Invention

In consideration of the problems above, the object of the present invention is to reduce the weight and manufacturing cost of the gear housing of a rack and pinion steering gear unit.

Means for Solving the Problems

The rack and pinion steering gear unit of the present invention comprises:

a rack shaft that reciprocates according to rotation of a pinion shaft;

ball joint sockets that are formed on both ends of the rack shaft and have a larger diameter than the rack shaft;

a pinion-side housing made of metal that supports a pinion-side end section of the rack shaft where the pinion shaft is located so that sliding movement of the rack shaft is possible, and that can be fastened to the vehicle frame; and a convex engagement section that is formed in the middle section in the axial direction of the rack shaft between the pinion-side end section and the non-pinion-side end section that is on the opposite side from the pinion-side end section, and that has a larger diameter than the rack shaft.

In the rack and pinion steering gear unit of the present invention, as the rack shaft displaces, one of the ball joint sockets that is attached to the pinion-side end section comes in contact with one end of the pinion-side housing, and restricts movement of the rack shaft toward the non-pinion side, and the convex engagement section comes in contact with the other end of the pinion-side housing, and restricts movement of the rack shaft toward the pinion side.

Preferably, the rack and pinion steering gear unit further comprises a non-pinion-side housing made of metal that supports the non-pinion-side end section of the rack shaft so that sliding movement of the rack shaft is possible, and that can be fastened to the vehicle frame, and a hollow cylindrical shaped intermediate cylindrical section that is connected to the pinion-side housing on one end, and is connected to the non-pinion-side housing on the other end, and covers the middle section of the rack shaft.

In this case, preferably, the non-pinion-side housing supports the non-pinion-side end section of the rack shaft by way of an elastic member such as rubber so that sliding movement of the rack shaft is possible.

Preferably, the rack shaft is formed by connecting a solid shaft on which a rack is formed and a hollow shaft on which the rack is not formed, and the convex engagement section is formed around the connecting section between the solid shaft and the hollow shaft.

Preferably, a damper made of an elastic material such as rubber is attached to the contact surface of the convex engagement section that comes in contact with the other end of the pinion-side housing.

Preferably, the intermediate cylindrical section can expand and contract in the axial direction of the rack shaft. More specifically, the intermediate cylindrical section is formed using a material having flexibility, and the entire length or part of the intermediate cylindrical section has a bellows shape. As an example of material having flexibility is synthetic resin or rubber.

Effect of the Invention

With the rack pinion steering gear unit of the present invention constructed as described above, together with being able to restrict movement of the rack shaft toward the non-pinion side by one end of the pinion-side housing coming in contact with a ball socket joint that is formed on the end section on the pinion side of the rack shaft, it is possible to restrict movement of the rack shaft toward the pinion side by the other end of the pinion-side housing coming in contact with the an convex engagement section that is formed in the middle section in the axial direction between the end section on the pinion side of the rack shaft and the end section on the non-pinion side. Therefore, in the case of the present invention, it is possible to use both ends of the pinion-side housing that is short in the width direction of the vehicle, so as to support thrust loads that act when restricting the movement of the rack shaft in the left-right direction, so the portion that requires large strength can be limited to the pinion-side housing that has a short length in the width direction of the vehicle. Consequently, together with being able to reduce the weight of the entire housing of the steering gear unit, it is possible to reduce manufacturing costs by simplifying the casting and other processes.

MODES FOR CARRYING OUT THE INVENTION

Example 1

Figure 1:
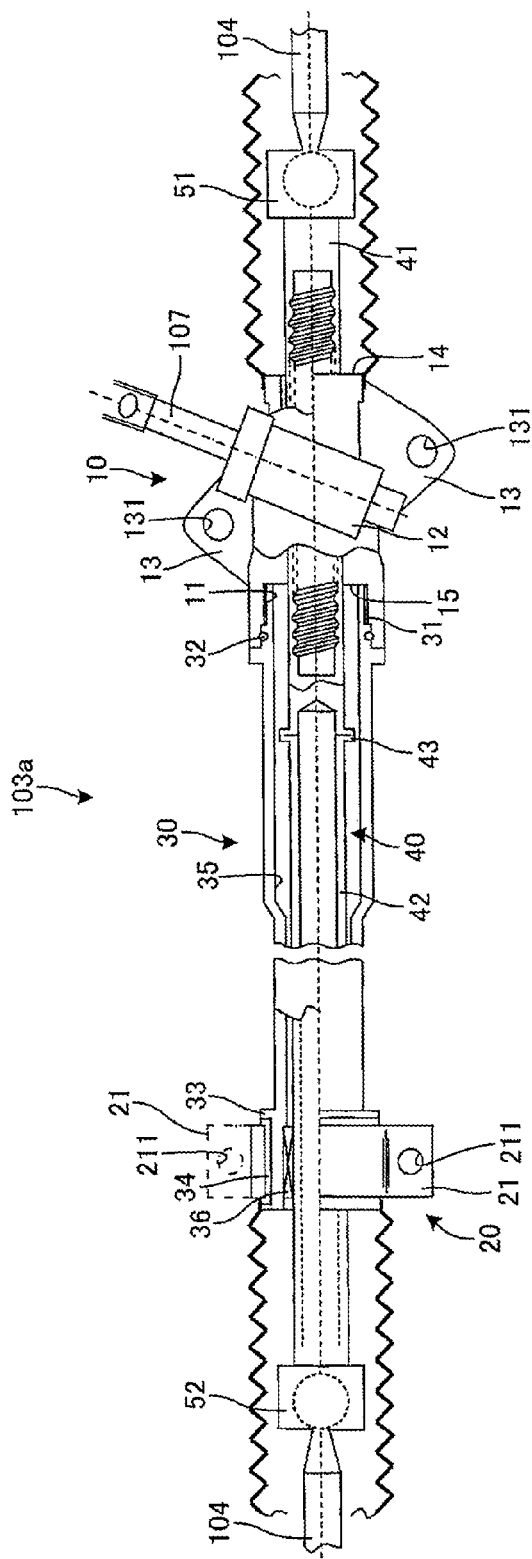
FIG. 1 is a front view with a partial cross-sectional view illustrating the main parts of a steering gear of a steering gear unit of a first example of an embodiment of the present invention.

FIG. 1 is a front view with a partial cross-sectional view illustrating the main parts of a steering gear unit 103a of this example. The steering gear unit 103a of this example is installed to the vehicle body frame (not illustrated in the figure) such as the front sub frame. The front side that is orthogonal to the paper surface in FIG. 1 is the upward side of the vehicle body, the back side that is orthogonal to the paper surface in FIG. 1 is the downward side of the vehicle body, the left-right direction in FIG. 1 is the width direction of the vehicle, the upward direction in FIG. 1 is the direction toward the rear of the vehicle body, and the downward direction in FIG. 1 is the direction toward the front of the vehicle body.

The steering gear unit 103a of this example comprises a pinion-side housing 10 on the right side of FIG. 1, a non-pinion-side housing 20 on the left side of FIG. 1, and an intermediate cylindrical section 30 that connects the pinion-side housing 10 and the non-pinion-side housing 20.

Of these members, the pinion-side housing 10 and the non-pinion-side housing 20 are formed by casting a metal such as an aluminum alloy.

On the other hand, the hollow, cylindrical shaped intermediate cylindrical section 30 is formed by injection molding or blow molding of synthetic resin. Male threads 31 are formed around the outer circumferential surface of the right end of the intermediate cylindrical section 30. The right end of the intermediate cylindrical section 30 is fastened to the pinion-side housing 10 by screwing the male threads 31 into female threads 11 that are formed around the inner circumferential surface of the left end of the pinion-side housing 10. An O-ring 32 is located between the inner circumferential surface of the left end of the pinion-side housing 10 and the outer circumferential surface of the right end of the intermediate cylindrical section 30, and this O-ring 32 maintains an air-tight seal in the connecting section between the pinion-side housing 10 and the intermediate cylindrical section 30. On the other hand, a flange section 33 is formed around the outer circumferential surface of the left end of the intermediate cylindrical section 30. This flange section 33 is fastened to the inner circumferential surface of the non-pinion-side housing 20 by way of a damper made of an elastic material.

A rack shaft 40 is located on the inside of the inner circumferential surface 35 of the intermediate cylindrical section 30 so as to be capable of sliding movement in the left-right direction of FIG. 1. A bearing bushing 36 is fastened on the inside of the left end of the inner circumferential surface 35 of the intermediate cylindrical section 30, and supports the left end of the rack shaft 40 so as to be capable of sliding movement thereof.

Ball joint sockets 51, 52 are formed on both ends in the axial direction of the rack shaft 40. Tie rods 104 are connected to these ball joint sockets 51, 52, and these tie rods 104 are connected to the wheels by way of a knuckle arm (not illustrated in the figure). The ball joint sockets 51, 52 are formed with a diameter that is greater than that of the rack shaft 40.

Figure 14:
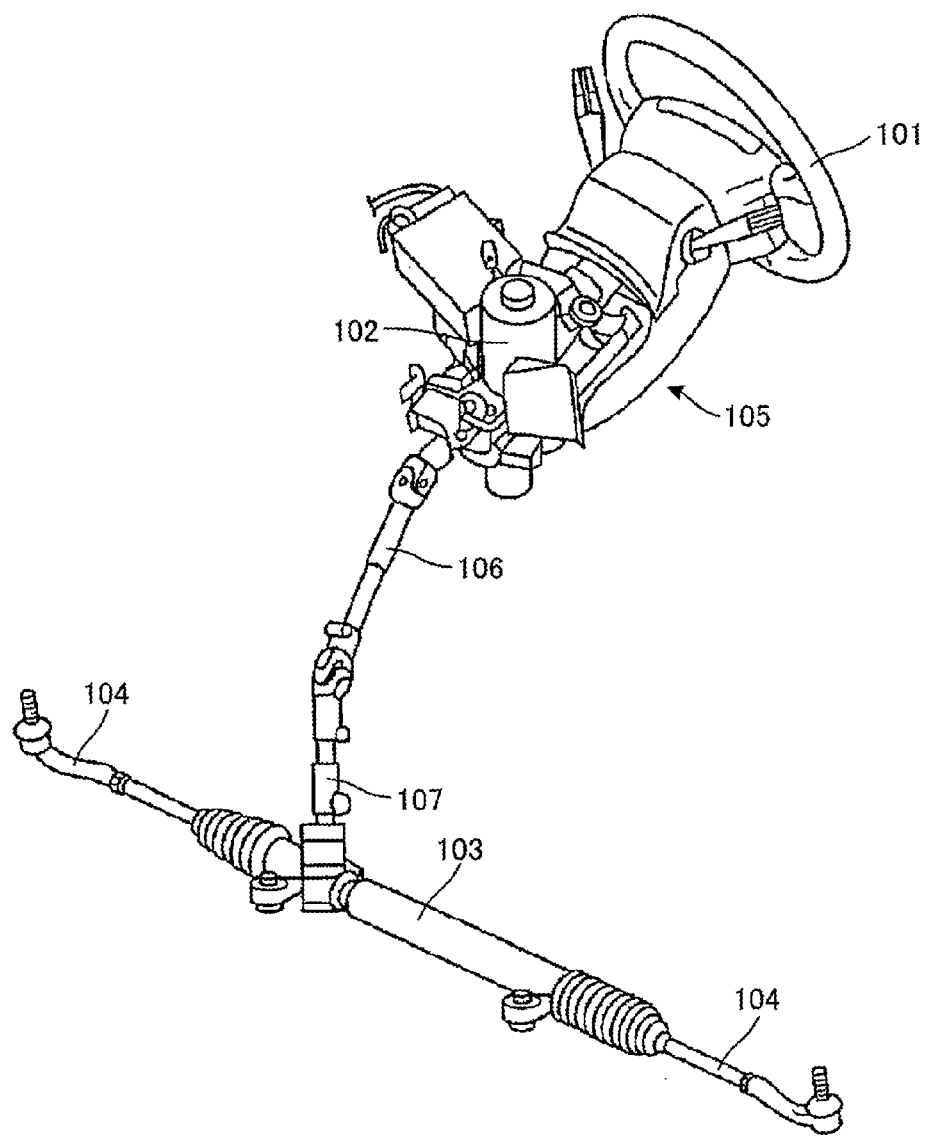
FIG. 14 is a perspective view illustrating the overall steering apparatus to which the steering gear unit of the present invention is applied.
Figure 15:
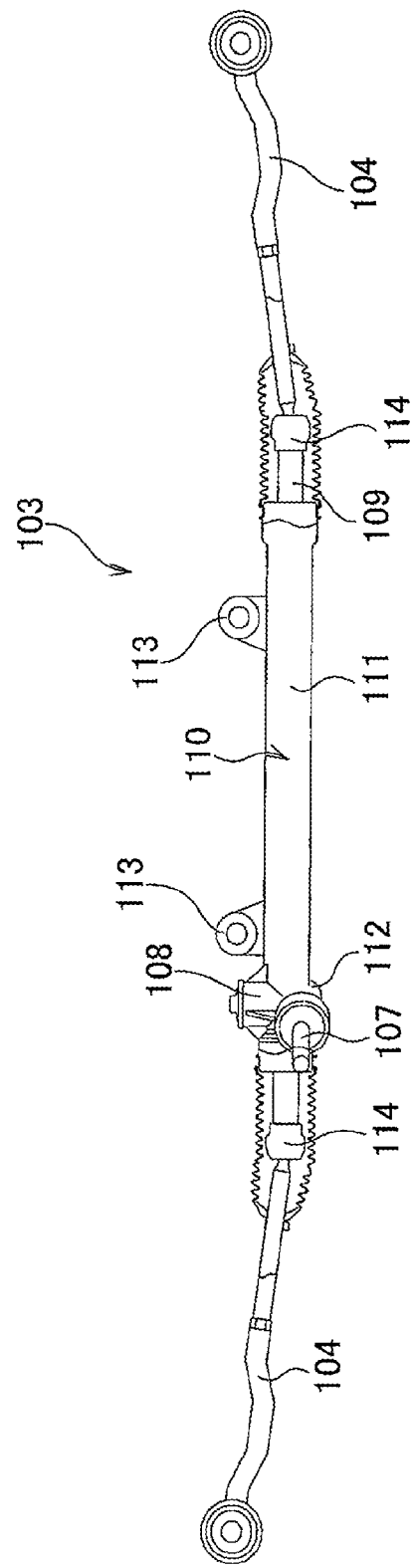
FIG. 15 is a top view illustrating a conventional steering gear unit.

A column shaped boss 12 for inserting the pinion is integrally formed in the pinion-side housing 10. A pinion (not illustrated in the figure) that engages with the rack shaft 40 is formed around the outer circumferential surface of the bottom end of the pinion shaft 107 that is inserted through this column shaped boss 12. On the other hand, as illustrated in FIG. 14, the top end of the pinion 107 is connected to the bottom end of an intermediate shaft 106 that is connected to the steering wheel 101.

As the operator rotates the steering wheel 101, the rotation is transmitted by the intermediate shaft 106 and a universal joint, and causes the pinion of the pinion shaft 107 to rotate. Due to the rotation of this pinion, the rack shaft 40 slides in the left-right direction, which changes the steering angle of the wheels.

A pair of vehicle-installation boss sections 13, 21 is respectively formed in both the pinion-side housing 10 and non-pinion-side housing 20. One circular installation hole 131, 211 is formed in the up-down direction of the vehicle in each of the vehicle-installation boss sections 13, 21, respectively.

Bolts (not illustrated in the figure) are inserted into these installation holes 131, 211, and by tightening these bolts to the vehicle frame, the pinion-side housing 10 and the non-pinion-side housing 20 are attached to the vehicle frame with rigid construction.

The intermediate cylindrical section 30 of the steering gear unit of this example is formed using synthetic resin, so the capability for supporting the steering reaction force from the wheels is small. Therefore, in this example, by attaching the metal pinion-side housing 10 and non-pinion-side housing 20 to the vehicle frame with rigid construction, the steering reaction force from the wheels is supported by the pinion-side housing 10 and the non-pinion side housing 20.

Moreover, the non-pinion-side housing 20 supports the intermediate cylindrical section 30 by way of a damper 34 made of an elastic material, so it is possible to reduce the radial load that is applied to this intermediate cylindrical section 30 from the bearing bushing 36.

The rack shaft 40 is formed so that a solid shaft 41, which is illustrated on the right side in FIG. 1 and on which the rack is formed, and a hollow shaft 42, which is illustrated on the left side of FIG. 1 and on which a rack is not formed, are joined by friction welding. A convex engagement section 43 is formed around the junction between the solid shaft 41 and the hollow shaft 42. This convex engagement section 43 is formed in the middle section in the axial direction between the pinion-side end section (right end section in FIG. 1) and the non-pinion-side end section (left end section in FIG. 1) of the rack shaft 40, and is formed in a disk shape having a larger diameter than the outer diameter of the solid shaft 41 and hollow shaft 42.

Therefore, when the rack shaft 40 is moved to the left side by the operator rotating the steering wheel 101 in one direction, the left side surface of the ball joint socket 51 on the right side comes in contact with the contact surface 14 on the right end of the pinion-side housing 10. In this way, the contact surface 14 of the pinion-side housing 10 forms a movement end to the movement of the rack shaft 40 toward the non-pinion side, and restricts movement of the rack shaft 40 toward the non-pinion side (left side in FIG. 1) beyond that point.

On the other hand, when the rack shaft 40 is moved to the right side by the operator rotating the steering wheel 101 in the other direction, the right side surface of the convex engagement section 43 provided on the rack shaft 40 comes in contact with the contact surface 15 on the left end of the pinion-side housing 10. In this way, the contact surface 15 of the pinion-side housing 10 forms a movement end to the movement of the rack shaft 40 toward the pinion side, and restricts movement of the rack shaft 40 toward the pinion side (right side in FIG. 1) beyond that point.

In this way, in this example, both ends of the pinion-side housing 10 in the width direction of the vehicle are used to support the thrust load that act when restricting the movement in the left and right direction of the rack 40. Therefore, the portion of the housing section of the steering gear unit 103 for which large strength is required can be limited to the pinion-side housing 10 that has a short length in the width direction of the vehicle. Consequently, together with being able to reduce the weight of the overall housing, it is possible to reduce the manufacturing cost by simplifying the casting process and other processing.

Moreover, not only does the intermediate cylindrical section not receive the thrust load when the ball joint socket 51 on the right side or the convex engagement section 43 comes in contact with the both the left or right end of the pinion-side housing 10, it also hardly receives the steering reaction force in the radial direction from the wheels. Therefore, there is little necessity for maintaining high strength, and it should be possible to maintain the waterproof and dustproof function of the rack shaft 40. In addition, it is possible to form the intermediate cylindrical section 30 by injection molding of synthetic resin, and thus this intermediate cylindrical section 30 can have a thin thickness and be lightweight. Consequently, together with being able to keep the material costs low, there is no need for secondary processing, so it is also possible to reduce the processing cost.

Example 2

Figure 2:
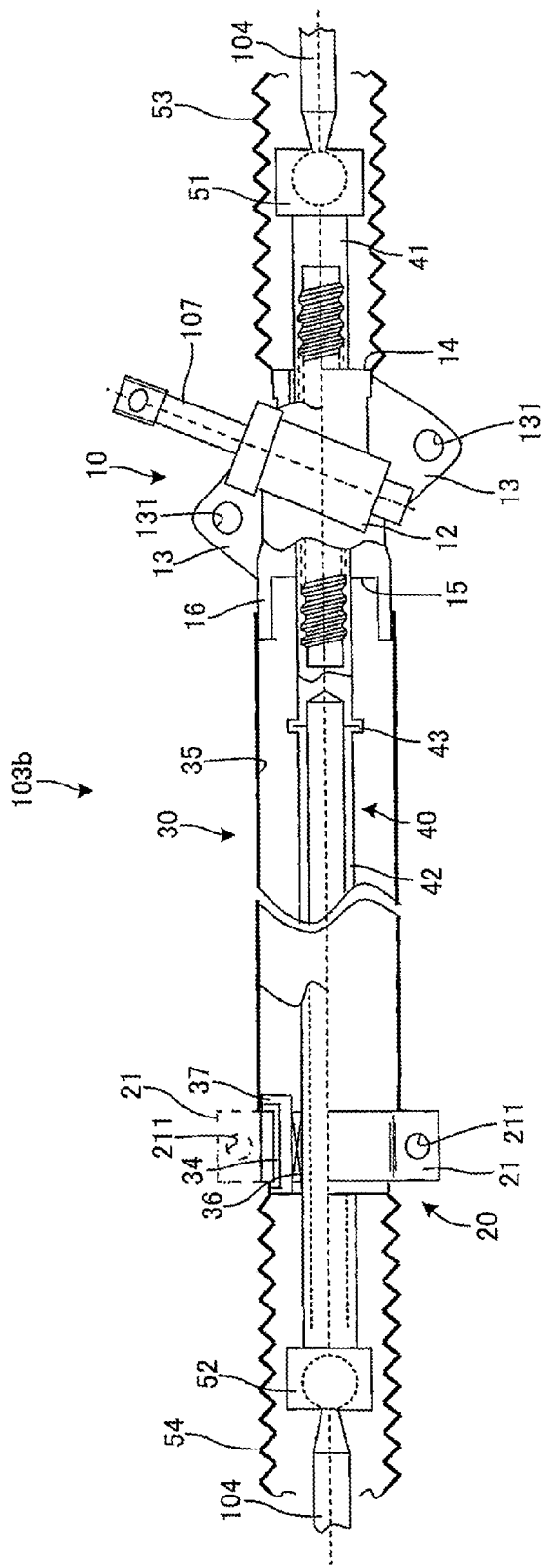
FIG. 2 is a front view with a partial cross-sectional view illustrating the main parts of a steering gear of a steering gear unit of a second example of an embodiment of the present invention.

FIG. 2 is a front view with a partial cross-sectional view illustrating the main parts of a steering gear unit of a second example of an embodiment of the present invention. In the explanation below, the explanation will center on the construction that differs from that of the first example, and any redundant explanation will be omitted or simplified. This example is a variation of the first example of an embodiment, and is an example in which the material of the intermediate cylindrical section 30 is a more flexible material.

In the steering gear unit 103*b* of this example, the hollow cylindrical shaped intermediate cylindrical section 30 is formed by injection molding or blow molding of rubber. The right end of this intermediate cylindrical section 30 is fastened to the pinion-side housing 10. More specifically, the right end of the inner circumferential surface of this intermediate cylindrical section 30 fits around the outside of a cylindrical section 16 that is formed on the left end of the pinion-side housing 10, and the right end of the intermediate cylindrical section 30 is fastened to the pinion-side housing 10 by tightening a band or wire around that right end. Alternatively, it is possible to fasten the right end of the intermediate cylindrical section 30 to the pinion-side housing 10 with adhesion by applying adhesive that functions as sealant around the outer circumferential surface of the cylindrical section 16 that is formed on the left end of the pinion-side housing 10, and then fitting the right end of the inner circumferential surface of the intermediate cylindrical section 30 around that outer circumferential surface of the cylindrical section 16.

On the other hand, the left end of the intermediate cylindrical section 30 is fastened to a bushing holder 37. This bushing holder 37 has outward-facing flange sections on both end sections, and is fastened to the inner circumferential surface of the non-pinion-side housing 20 by way of a damper 34 made of an elastic material. The left end of the inner circumferential surface 35 of the intermediate cylindrical section 30 fits around the outside of the flange section on the right end side of the bushing holder 37, and by further tightening it with a band, the left end of this intermediate cylindrical section 30 is fastened to the bushing holder 37 in a state wherein an airtight seal is maintained in the connecting section between the intermediate cylindrical section 30 and the bushing holder 37.

In this example, the intermediate cylindrical section 30 can be such that all or part of the length has a bellows shape that can expand or contract. By forming a bellows shape, manufacturing error of each of the members is absorbed by expansion or contraction of the bellows portion, so the work of attaching the pinion-side housing 10 and non-pinion-side housing 20 to the vehicle frame is simplified. Moreover, because the bellows portion expands or contracts, there is not need for the installation holes 131, 211 to be long holes in the axial direction of the rack shaft 40, and these installation holes 131, 211 can be simple round holes. Furthermore, even in models where the length of the rack shaft 40 is different, by flexibly expanding or contracting overall length of the intermediate cylindrical section 30, it is possible to use intermediate cylindrical section 30 in common.

Figure 3:
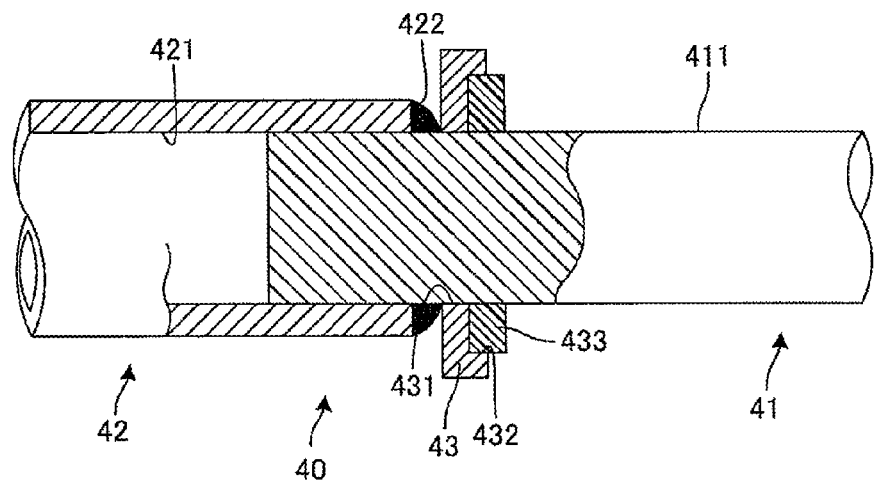
FIG. 3 is a front view with a partial cross-sectional view illustrating a variation of a convex engagement section that is formed on the rack shaft.

A rack shaft 40 is located on the inside of the inner circumferential surface 35 of the intermediate cylindrical section 30 so as to be capable of sliding movement in the left-right direction in FIG. 3. Moreover, the bearing bushing 36 is fitted inside the bushing holder 37 to which the left end of the intermediate cylindrical section 30 is fastened, and this bearing busing 36 supports the left end of the rack shaft 40 so as to be capable of sliding movement.

In this example as well, the ball joint sockets 51, 52 are covered by bellows shaped ball joint boots 53, 54 in order to be water proof and dust proof. These ball joint boots 53, 54 can be integrally formed with the bellows shaped intermediate cylindrical section 30.

The intermediate cylindrical section 30 of this example also cannot support the steering reaction force from the wheels. Therefore, by attaching the metal pinion-side housing 10 and non-pinion-side housing 20 to the vehicle frame with rigid construction, the steering reaction force from the wheels is supported by the pinion-side housing 10 and non-pinion-side housing 20.

In this example, construction is such that the intermediate cylindrical section 30 is formed by injection molding of rubber that has flexibility, so the intermediate cylindrical section 30 has a thin thickness and is lightweight. Therefore, it is possible to keep material costs low, and because there is no need for secondary processing, it is possible to reduce processing costs. In the present invention, instead of a flexible material such as synthetic resin or rubber, it is also possible to manufacture the intermediate cylindrical section 30 using a light metal such as an aluminum alloy whose thickness is made thin. The other construction and function of this second example of an embodiment are the same as in the first example.

Variations of Example 1 And Example 2

FIG. 3 to FIG. 8 illustrate variations of the convex engagement section for restricting the movement of the rack shaft. FIG. 3 is an example in which a solid shaft is welded to a hollow shaft having a larger diameter than the solid shaft, and a separate convex engagement section is fastened to the solid shaft. More specifically, the left end of a solid shaft 41 is fitted inside the right end of the inner circumferential surface 421 of a large diameter hollow shaft 42, and right end surface 422 of the hollow shaft 42 is welded and fastened to the outer circumferential surface 411 of the solid shaft 41. Next, the inner circumferential surface of a ring-shaped convex engagement section 43, which is a separate part, is fitted around the outer circumferential surface 411 of the solid shaft 41, after which, the convex engagement section 43 is crimped and fastened to the outer circumferential surface 411 of the solid shaft 41. Moreover, a damper 433 made of an elastic material is attached to a concave section 432 on the right end surface of the convex engagement section 43.

With construction as described above, the rack shaft 40 moves to the right side, and the convex engagement section 43 comes in contact via the damper 433 made of elastic material with the contact surface 15 on the left end of the pinion-side housing 10 such as illustrated in FIG. 1 and FIG. 2, so it is possible to lessen impact loads during contact. In addition, it is not necessary to increase the strength of parts such as the rack shaft 40 and pinion shaft 107, and thus it is possible to make the parts more compact and lightweight.

Figure 4:
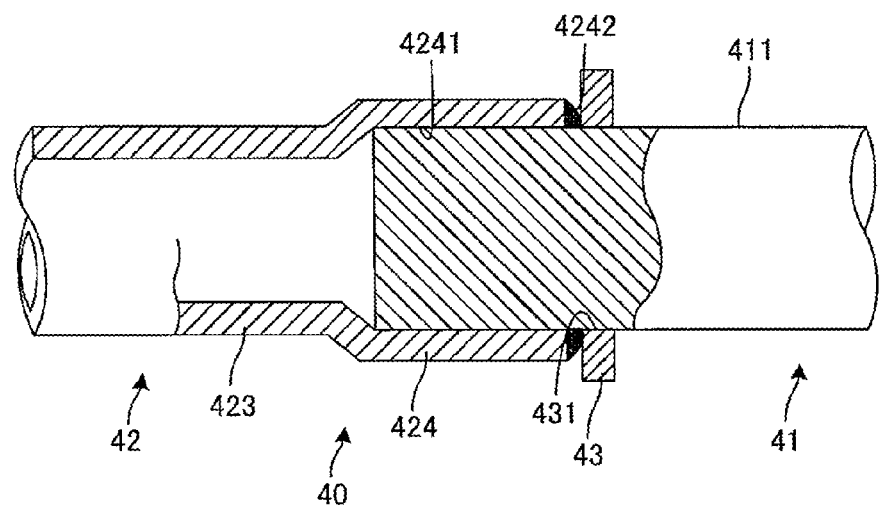
FIG. 4 is a front view with a partial cross-sectional view illustrating a variation of a convex engagement section that is formed on the rack shaft.

FIG. 4 is an example of welding a solid shaft to the right end side of a hollow shaft, the diameter of which has been expanded, and fastening the separate convex engagement section to the solid shaft. More specifically, the left side of a hollow shaft 42 is taken to be a small-diameter hollow section 423, and a large-diameter hollow section 424 is only formed on the right end side. A solid shaft 41 is fitted inside the inner circumferential surface 4241 of the large-diameter hollow section 424, and the right end surface 4242 of the large-diameter hollow section 424 is welded and fastened to the outer circumferential surface 411 of the solid shaft 41. Next, the inner circumferential surface 431 of the ring-shaped convex engagement section 43, which is a separate part, is fitted around the outer circumferential surface 411 of the solid shaft 41, after which the convex engagement section 43 is crimped and fastened to the outer circumferential surface 411 of the solid shaft 41.

With the construction described above, the hollow shaft 42 can be such that it supports only the steering reaction force from the wheels and not the thrust load when the ball joint socket 51 on the right side as illustrated in FIG. 1 and FIG. 2 or the convex engagement section 43 come in contact with both the left and right ends of the pinion-side housing 10. Therefore, it is possible to use a thin-walled, lightweight hollow material, and together with being able to keep material costs low it is possible to reduce the weight.

Figure 5:
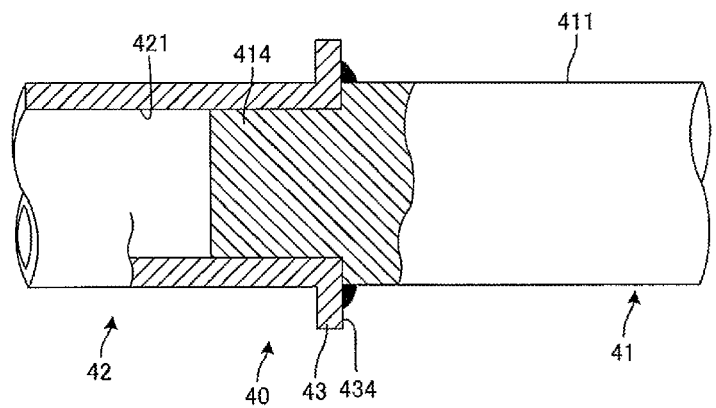
FIG. 5 is a front view with a partial cross-sectional view illustrating a variation of a convex engagement section that is formed on the rack shaft.

FIG. 5 is an example where a solid shaft is welded to a hollow shaft, and the convex engagement section is integrally formed with the hollow shaft 42. More particularly, a flange shaped convex engagement section 43 is integrally formed on the right end of a hollow shaft 42. Then, together with fitting a small-diameter solid section 414 that is on the left end of the solid shaft inside the right end of the inner circumferential surface 421 of the hollow shaft 42, the right end surface 434 of the convex engagement section 43 is welded and fastened to the outer circumferential surface 411 of the solid shaft 41. With this kind of construction, the convex engagement section 43 is integrally formed with the hollow shaft 42, so it is possible to reduce the number of parts, and thus it is possible to reduce the manufacturing cost.

Figure 6:
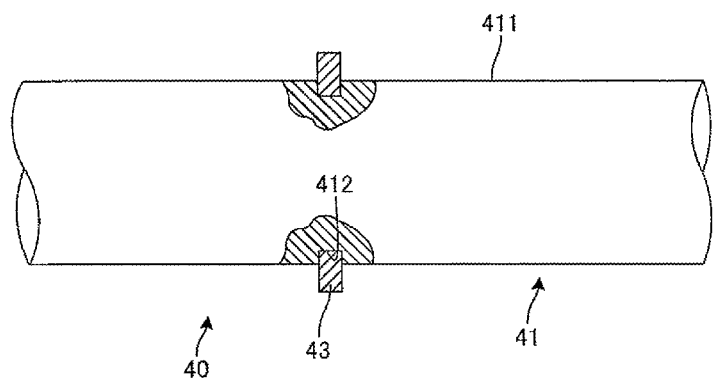
FIG. 6 is a front view with a partial cross-sectional view illustrating a variation of a convex engagement section that is formed on the rack shaft.

FIG. 6 is an example of inserting and fastening a separate ring shaped convex engagement section in a ring shaped groove that is formed around the outer circumferential surface of the solid shaft. More specifically, together with forming a ring shaped groove 412 that is recessed inward in the radial direction around the outer circumferential surface 411 of the solid shaft 41, this snap ring shaped convex engagement section 43 is fastened to the solid shaft 41 by fitting the convex engagement section 43 around this ring shaped groove 412.

Figure 7:
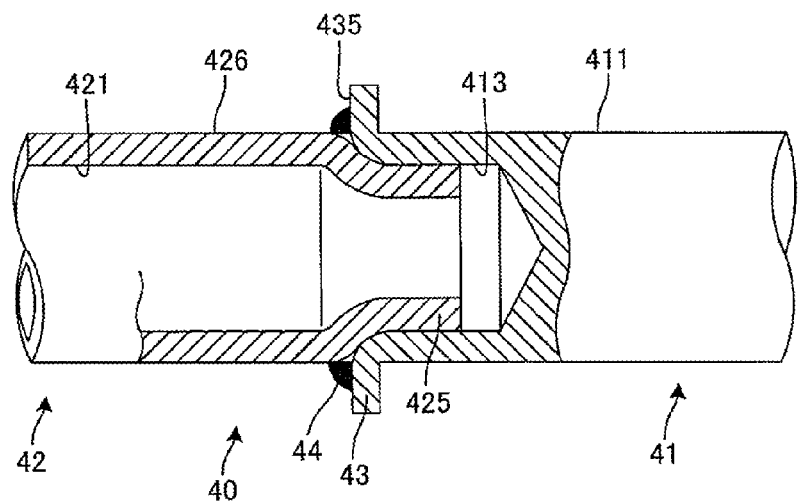
FIG. 7 is a front view with a partial cross-sectional view illustrating a variation of a convex engagement section that is formed on the rack shaft.

FIG. 7 is an example where a solid shaft is fitted around a hollow shaft and welded, and a convex engagement section is integrally formed with the solid shaft. More specifically, together with integrally forming an outward-facing flange shaped convex engagement section 43 on the left end of a solid shaft 41, and a small-diameter hollow section 425 is formed on the right end of the hollow shaft 42. Then, this small-diameter hollow section 425 of the hollow shaft 42 is fitted on the inside of the inner circumferential surface 413 on the left end of the solid shaft 41. After that, the left end surface 435 of the convex engagement section 43 and the outer circumferential surface 426 of the solid shaft 42 are welded and fastened together.

With this kind of construction, the rack shaft 40 moves toward the right side in FIG. 7, and when the convex engagement section 43 comes in contact with the contact surface 15 on the left side of the pinion-side housing 10 as illustrated in FIG. 1 and FIG. 2, the welded section 44 supports the convex engagement section 43 from the rear, and prevents the convex engagement section from tilting. Therefore, it is possible to increase the rigidity of the convex engagement section 43. Moreover, the convex engagement section 43 is integrally formed with the solid shaft 41, so it is possible to reduce the number of parts, and thus it is possible to reduce the manufacturing cost.

Figure 8:
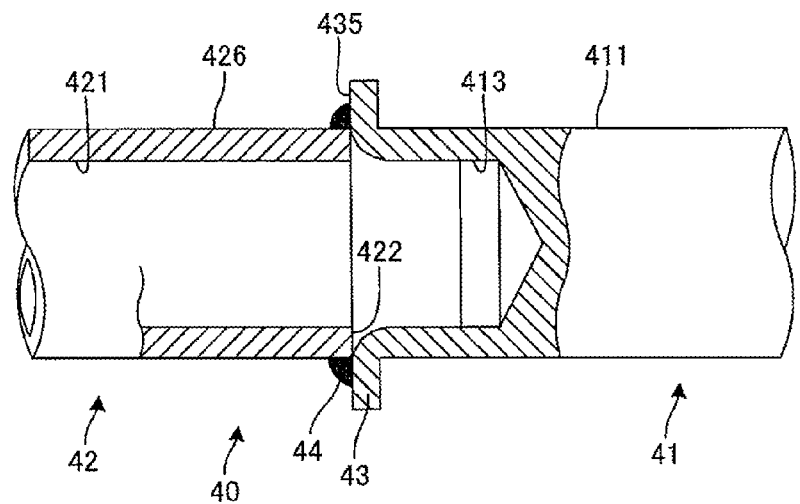
FIG. 8 is a front view with a partial cross-sectional view illustrating a variation of a convex engagement section that is formed on the rack shaft.

FIG. 8 is an example where, together with the end surface of a hollow shaft in contact with the end surface of the solid shaft and welding, a convex engagement section is integrally formed with the end section of the solid shaft. More specifically, an outward-facing flange shaped convex engagement section 43 is integrally formed on the left end of a solid shaft 41. Then the right end surface 422 of a hollow shaft 42 is brought into contact with the left end surface 435 of the convex engagement section 43. After that, the left end surface of the convex engagement section 43 and the outer circumferential surface 426 of the hollow shaft 42 are welded and fastened together.

With the construction described above, the rack shaft 40 moves to the right side in FIG. 8, and together with the convex engagement section 43 coming in contact with the contact surface 15 on the left end of the pinion-side housing 10 such as illustrated in FIG. 1 and FIG. 2, the weld section 44 supports the convex engagement section 43 from the rear and prevent the convex engagement section from tilting. Therefore, it is possible to increase the rigidity of the convex engagement section 43. Moreover, the convex engagement section 43 is integrally formed with the solid shaft 41, so it is possible to reduce the number of parts, and thus it is possible to reduce the manufacturing cost.

In the first and second examples of an embodiment, examples of applying the present invention to a column assist type rack and pinion type power steering apparatus were explained, however, the present invention can also be applied to a pinion assist type of rack and pinion type power steering apparatus, or a manual rack and pinion steering apparatus.

Example 3

Figure 9:
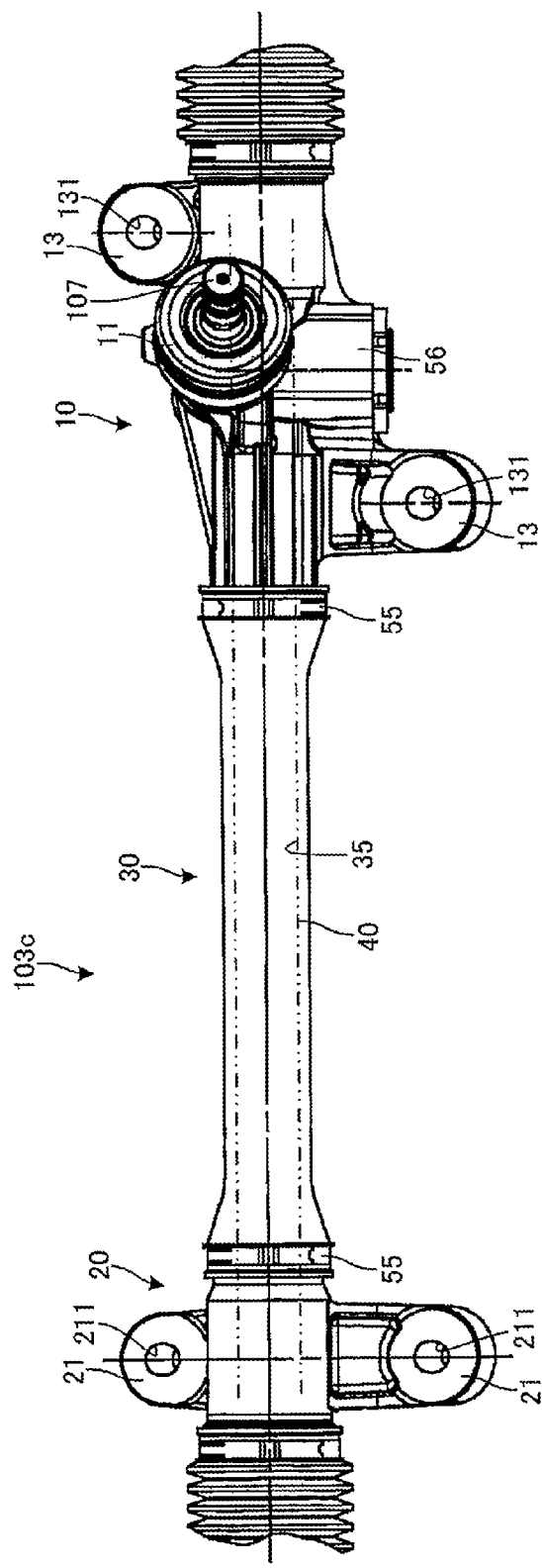
FIG. 9 is a front view with a partial cross-sectional view illustrating the main parts of a steering gear of a steering gear unit of a third example of an embodiment of the present invention.

FIG. 9 is a top view that illustrates the main part of a steering gear unit 103c of a steering apparatus of a third example of an embodiment of the present invention. In the following explanation, explanations that are redundant with the examples of the embodiment above are omitted or simplified, and the same reference numbers are given to identical parts. The steering gear unit 103c of this example is attached to the vehicle frame (not illustrated in the figure) such as the front sub frame. The front side that is orthogonal to the paper surface in FIG. 9 is the upward side of the vehicle, the back side that is orthogonal to the paper surface in FIG. 9 is the downward side of the vehicle, the left-right direction in FIG. 9 is the left-right direction of the vehicle, the upward direction in FIG. 9 corresponds to forward direction of the vehicle and the downward direction in FIG. 9 corresponds to the backward direction of the vehicle.

The steering gear unit 103c comprises a pinion-side housing 10 on the right side in FIG. 9, a non-pinion-side housing 20 on the left side in FIG. 9, and an intermediate cylindrical section 30 that connects the pinion-side housing 10 and the non-pinion-side housing 20.

The pinion-side housing 10 and the non-pinion-side housing 20 are formed by casting metal such as an aluminum alloy. On the other hand, a non-metallic material having flexibility such as synthetic resin or rubber is used for the hollow cylindrical shaped intermediate cylindrical section 30, and this intermediate cylindrical section 30 is formed by injection molding or blow molding. Synthetic resin or rubber is lightweight when compared with a metal material, and together with having large elasticity, is flexible and can expand or contract.

The right end of this kind of intermediate cylindrical section 30 is fastened to the left end of the pinion-side housing 10. More specifically, together with inserting a cylindrical section (not illustrated in the figure) that is formed on the left end of the pinion-side housing 10 into the right end of the inner circumferential surface 35 of the intermediate cylindrical section 30, the right end of the intermediate cylindrical section 30 and the left end of the pinion-side housing 10 are fastened by a band 55.

On the other hand, the left end of the intermediate cylindrical section 30 is fastened to the right end of the non-pinion-side housing 20. More specifically, together with inserting a cylindrical section (not illustrated in the figure) that is formed on the right end of the non-pinion-side housing 20 into the left end of the inner circumferential surface 35 of the intermediate cylindrical section 30, the left end of the intermediate cylindrical section 30 and the right end of the non-pinion-side housing 20 are fastened by a band 55. As a result, both end of the intermediate cylindrical section 30 are fastened using bands 55, so it is possible to main an airtight seal in the connecting sections. Alternatively, wire could be used for fastening instead of bands 55.

In this example, in a state of being adjacent to a column shaped boss 12, a column shaped boss 56 for inserting a rack guide that protrudes toward the rear of the vehicle (toward the downward side of FIG. 9) is integrally formed on the pinion-side housing 10. A rack guide (not illustrated in the figure) is inserted into this column shaped boss 56 for inserting a rack guide. This rack guide, using rollers or the like, guides the rear surface (surface on the opposite side from the rack teeth side) of the rack shaft 40, and by preventing deformation of the rack shaft 40 due to a reaction force that occurs when engaging with the pinion, allows for the rack shaft 40 to slide smoothly.

In this example as well, the intermediate cylindrical section 30 is formed using synthetic resin or rubber having flexibility, and because the intermediate cylindrical section 30 has elasticity and flexibility, its ability to support the steering reaction force from the wheels is small or it cannot support the steering reaction force at all. Therefore, in this example, by attaching the metal pinion-side housing 10 and the non-pinion-side housing 20 to the vehicle frame with rigid construction, the pinion-side housing 10 and the non-pinion-side housing 20 support the steering reaction force from the wheels.

Moreover, the intermediate cylindrical section 30 of this example is formed using a non-metallic material having flexibility such as synthetic resin or rubber, so when compared with making this intermediate cylindrical section 30 using a metallic material, it is lightweight, and together with having large elasticity, is flexible, and can expand and contract. In addition, when compared with using a metallic material, together with being able to reduce the weight, it is possible to keep material costs low. Furthermore, there is no need for secondary processing, so it is also possible to reduce processing costs.

In the case of this example as well, the pinion shaft 107 is located on or near the connecting line between the two installation holes 131 that are formed in the pinion-side housing 10. Therefore, it is possible to effectively receive the reaction force from the rack and pinion during steering. The other construction and functions of this third example of the embodiment are the same as in the first and second examples of the embodiment.

Example 4

Figure 10:
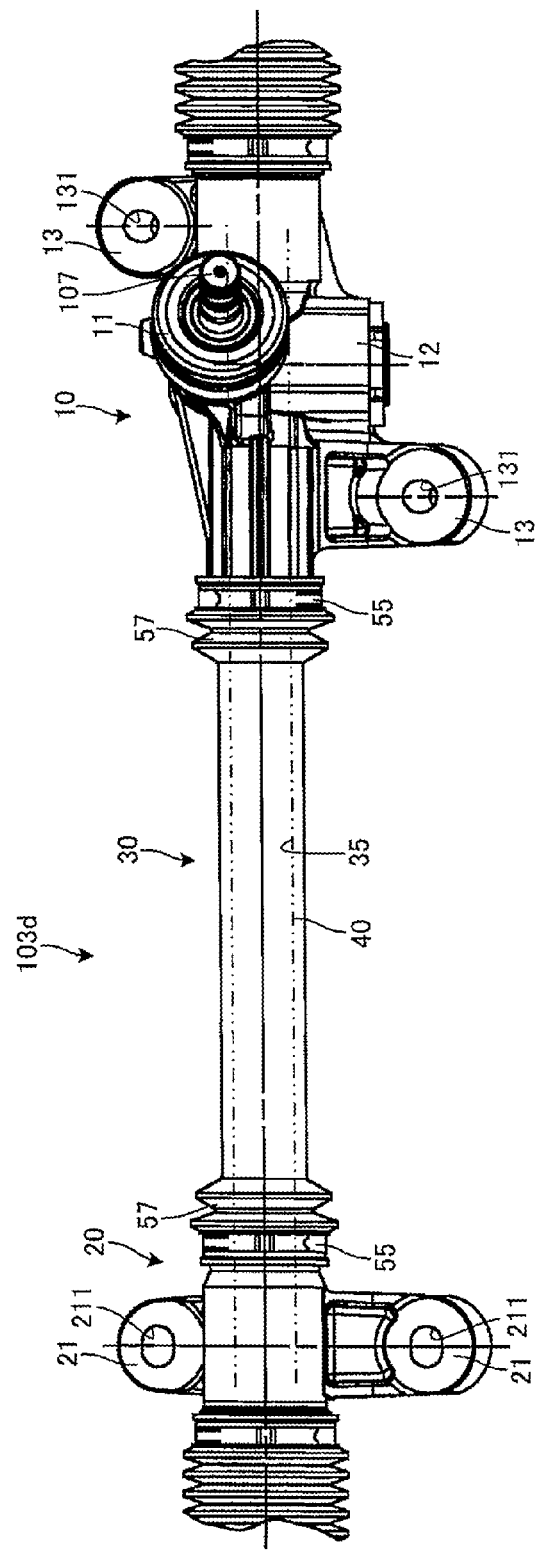
FIG. 10 is a front view with a partial cross-sectional view illustrating the main parts of a steering gear of a steering gear unit of a fourth example of an embodiment of the present invention.

FIG. 10 is a top view illustrating the main parts of a steering gear unit 103d of a steering apparatus of a fourth example of an embodiment of the present invention. This example is a variation of the third example of the embodiment, so together with omitting or simplifying any explanations of portions that are redundant with the third example, the same reference numbers are given to identical parts. This example is an example where bellows are formed on both ends of the intermediate cylindrical section 30.

In other words, in this example, a non metal material having flexibility such as synthetic resin or rubber is used, and expanding and contracting bellows 57 are formed on the right end and the left end of the intermediate cylindrical section 30 that is formed by injection molding or blow molding.

In the case of this example, bellows 57 that can expand and contract are formed on both ends of the intermediate cylindrical section 30, so manufacturing error or assembly error of the members is absorbed by the expansion or contraction of the bellows 57, and thus the work of attaching the pinion-side housing 10 and the non-pinion-side housing 20 to the vehicle frame becomes easier. The bellows 57 expand or contract, so the installation holes 131, 211 do not need to be long holes that are long in the axial direction of the rack shaft 40, and thus these installation holes 131, 211 can be simple round holes.

Example 5

Figure 11:
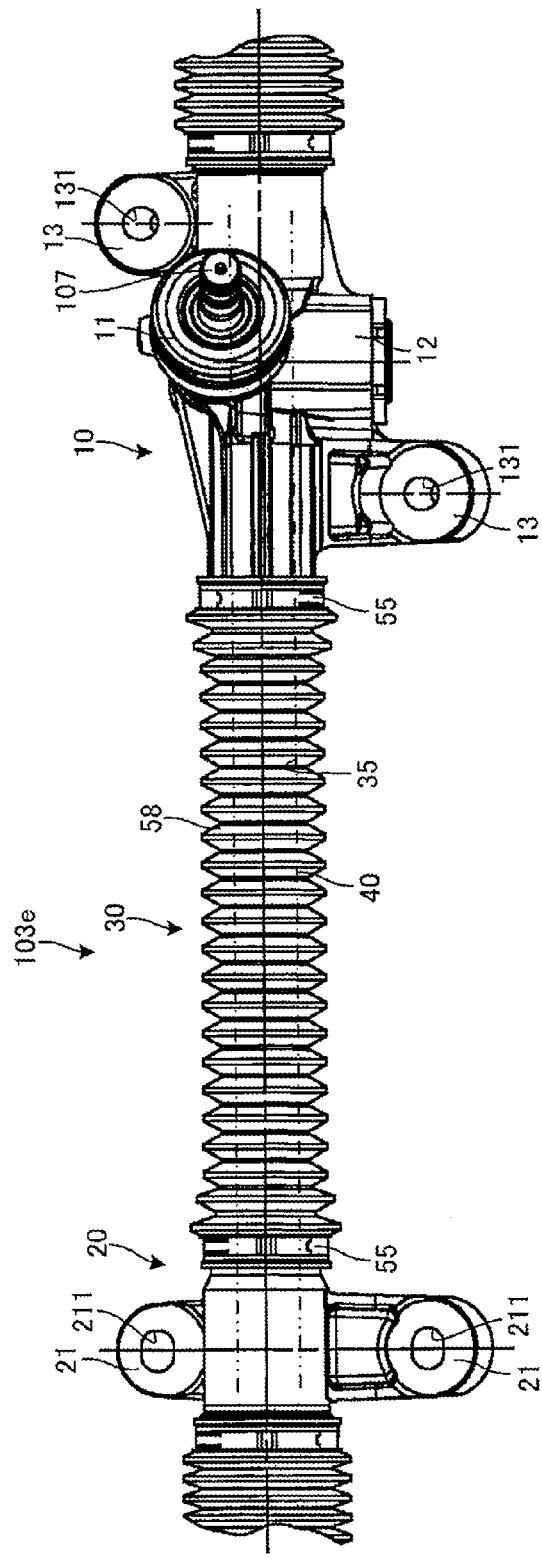
FIG. 11 is a front view with a partial cross-sectional view illustrating the main parts of a steering gear of a steering gear unit of a fifth example of an embodiment of the present invention.

FIG. 11 is a top view that illustrates the main parts of a steering gear unit 103e of a steering apparatus of a fifth example of an embodiment of the present invention. This example is a variation of the third example of the embodiment, so together with omitting or simplifying any explanations of portions that are redundant with the third example, the same reference numbers are given to identical parts. This example is an example where a bellows is formed along the entire length of the intermediate cylindrical section 30.

In other words, in this example, a non-metallic material having flexibility such as synthetic resin or rubber is used, and a bellows 58 that can expand and contract is formed along the entire length of a the intermediate cylindrical section 30 that was formed by injection molding or blow molding.

In the case of this example, a bellows 58 that can expand or contract is formed along the entire length of the rack shaft 40, so even in the case of models having rack shafts 40 of different lengths, by flexibly expanding or contracting the entire length of the intermediate cylindrical section 30, the intermediate cylindrical section 30 can be used in common.

Example 6

Figure 12:
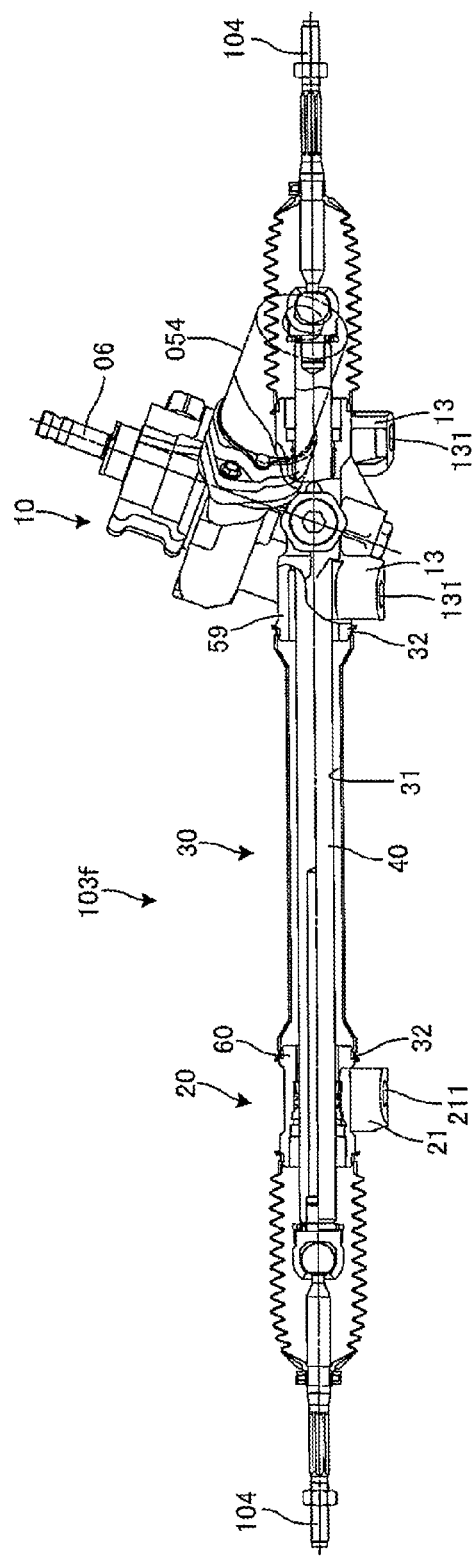
FIG. 12 is a front view with a partial cross-sectional view illustrating the main parts of a steering gear of a steering gear unit of a sixth example of an embodiment of the present invention.
Figure 13:
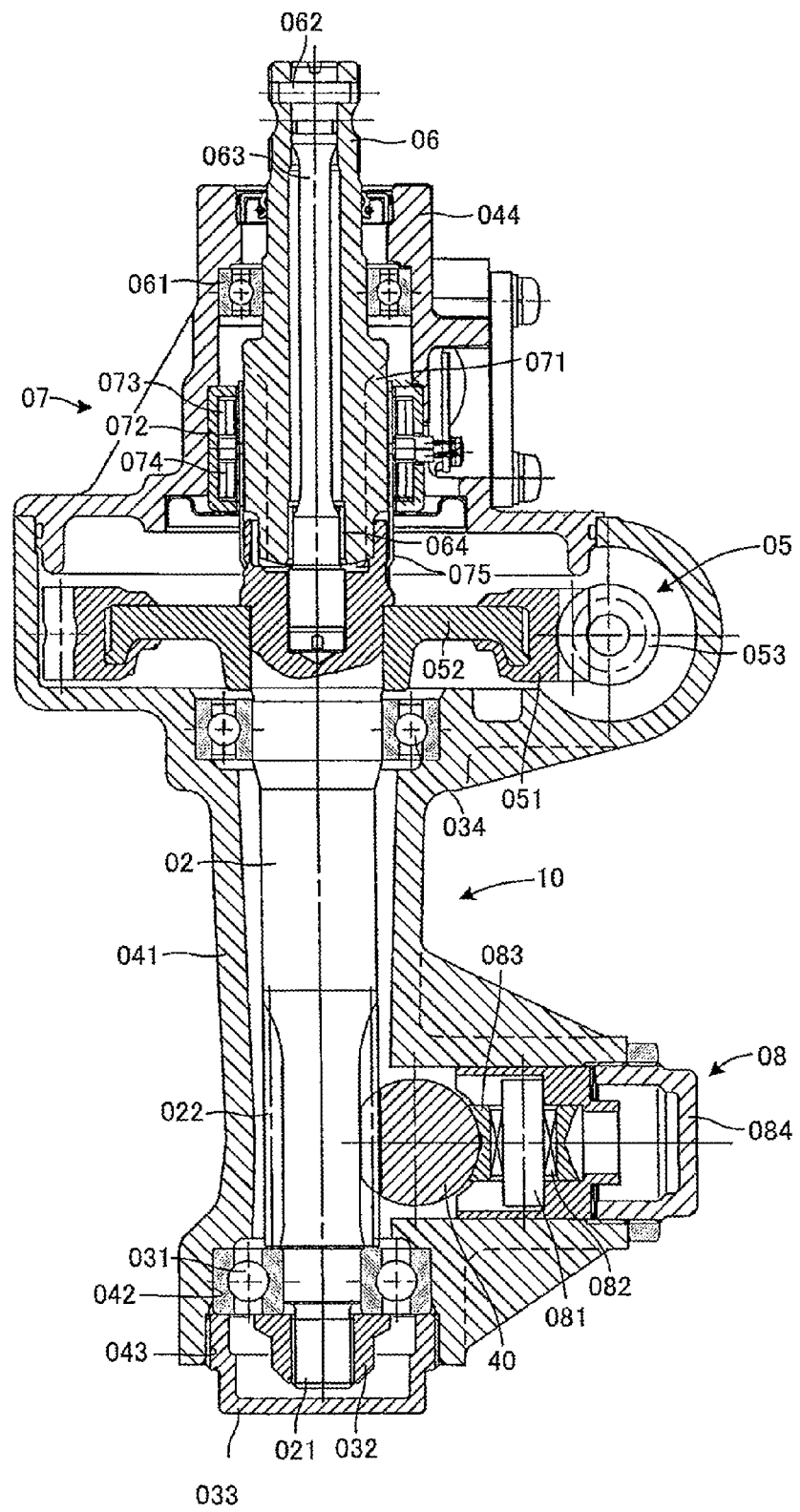
FIG. 13 is a vertical cross-sectional view illustrating the engagement section between the pinion shaft and the rack in FIG. 12.

FIG. 12 is a top view with a partial cross-sectional view that illustrates the main parts of a steering gear unit 103f of a steering apparatus of a sixth example of an embodiment of the present invention, and FIG. 13 is a vertical cross-sectional view illustrating the engagement section between the pinion and the rack in FIG. 12. This example is a variation of the third example of the embodiment, so together with omitting or simplifying any explanations of portions that are redundant with the third example, the same reference numbers are given to identical parts. This example is an example of applying the present invention to a pinion assist type of rack and pinion power steering apparatus.

In the steering gear unit 103*f* of this example, the upward direction in FIG. 12 is the upward side of the vehicle, the downward direction is the downward side of the vehicle, the left-right direction in FIG. 12 is the left-right direction of the vehicle, and the direction orthogonal to the paper surface in FIG. 12 is the forward-backward direction of the vehicle.

As illustrated in FIG. 13, the bottom end section of the pinion shaft 02 is supported by a ball bearing 031 so as to be able to rotate. Moreover, a locking nut 032 is screwed onto male threads 021 that are formed around the outer circumferential surface of the bottom end section of the pinion shaft 02. This locking nut 032 supports and fastens the inner ring of the ball bearing 031 to a specified position on the bottom end section of the pinion shaft 02.

The outer ring of the ball bearing 031 is pressure fitted into a bearing hole 042 that is formed in a lower gear box 041 that is provided on the lower half section of the pinion-side housing 10. The outer ring of the ball bearing 031 is pressed upward, and supported by and fastened to the lower gear box 041 by an end cover 033 that is screwed into female threads 043 that are formed around the inner circumferential surface of the end section on the opening side of the bearing hole 042.

Moreover, the metal core 052 of a worm wheel 051 that engages with the worm 053 of a worm reducer 05 is pressure fitted into the top end section of the pinion shaft 02. This worm 053 is connected to the output shaft of an electric motor 054 (see FIG. 12) for steering assistance. The lower portion of the portion of the pinion shaft 02 into which the worm wheel 051 is pressed is supported by a ball bearing 034 so as to be able to rotate with respect to the lower gear box 041 and so that force in the radial direction is supported.

On the other hand, in an upper gear box 044 that is fastened to the top end surface of the lower gear box 041, an input shaft 06 that is connected to the steering wheel 101 by way of an intermediate shaft 106 such as illustrated in FIG. 14 is supported by a ball bearing 061 so as to be able to rotate. A torsion bar 063 that is connected at the top end to this input shaft 06 by a pin 062 is supported around the bottom end by a bushing 064, and the portion further below this bushing 064 is connected by a press fit to the top end section of the pinion shaft 02.

A torque sensor 07 for detecting torque that acts on the torsion bar 063 that is connected as described above comprises a sensor shaft section 071, a pair of detection coils 073, 074, and a cylindrical member 075. The sensor shaft section 071 is formed on the bottom end section of the input shaft 06, and a plurality of convex ridges that extend in the axial direction are formed at uniform intervals in the circumferential direction. Moreover, the detection coils 073, 074 are located on the inside of a yoke that is pressed into the upper gear box 044. Furthermore, the cylindrical member 075 is located between the sensor shaft section 071 and the detection coils 073, 074, and is fastened to the top end of the pinion shaft 02. A plurality of rectangular windows that are evenly spaced in the circumferential direction are formed at positions that face the detection coils 073, 074.

By operating the steering wheel 101, the input shaft 06 rotates, and that rotation force is transmitted to the pinion shaft 02 by way of the torsion bar 063. When this happens, twisting occurs in the torsion bar 063 that connects the input shaft 06 and the pinion shaft 02 due to resistance from the steered wheels, and relative rotation occurs between the convex ridges that are formed on the surface of the sensor shaft section 071 and the windows in the cylindrical member 075. As a result, a magnetic flux that occurs in the sensor shaft section 071 increases or decreases.

This increase or decrease in magnetic flux that occurs in the sensor shaft section 071 is detected as change in the inductance in the detection coils 073, 074, and from this the torque acting on the torsion bar 063 is detected. Based on this, the electric motor 054 is driven, and the worm 053 is caused to rotate with the required auxiliary steering force. The rotation of the worm 053 is transmitted to the worm wheel 051, the pinion shaft 02 and the rack shaft 40, and changes the steering direction by way of the tie rods 104 that are connected to the rack shaft 40.

A rack guide 08 presses a roller 083 against the back surface of the rack shaft 40 by way of an adjustment cover 084. This roller 083 is supported by a shaft 081 and a needle bearing 082 that is located around the shaft 081 so as to be able to rotate. The adjustment cover 084 presses the roller 083 against the back surface of the rack shaft 40 by way of a plate spring. As a result, it is possible to eliminate backlash in the engagement section between the pinion 022 and the rack shaft 40, and thus the rack shaft 40 can move smoothly.

As illustrated in FIG. 12, boss sections 13, 21 for attachment to the vehicle body are formed on the pinion-side housing 10 and the non-pinion-side housing 20 and protrude in the forward-backward direction of the vehicle (up-down direction in FIG. 12). One circular installation hole 131, 211 is formed in the up-down direction of the vehicle (orthogonal direction to the paper surface in FIG. 13) in each of the boss sections 13, 21 for attachment to the vehicle.

Bolts (not illustrated in the figure) are inserted in the installation holes 131, 211, and by tightly attaching the bolts to the vehicle frame, the pinion-side housing 10 and the non-pinion-side housing 20 are attached to the vehicle body with rigid construction.

The intermediate cylindrical section 30 of this example is also formed using synthetic resin or rubber having flexibility, and because the intermediate cylindrical section 30 has elasticity and flexibility, its ability to support the steering reaction force from the wheels is small or impossible. Therefore, in this example, by attaching the metal pinion-side housing 10 and the non-pinion-side housing 20 to the vehicle frame with rigid construction, the pinion-side housing 10 and non-pinion-side housing 20 support the steering reaction force from the wheels.

Moreover, non-metallic material having flexibility such as synthetic resin or rubber is used for the intermediate cylindrical section 30 of this example, so when compared with construction using a metallic material, the intermediate cylindrical section 30 is lightweight, and together with having large elasticity, has flexibility and is able to expand and contract. In addition, when compared with the case of using a metallic material, together with being able to make the intermediate cylindrical section 30 more lightweight, it is possible to keep material costs low. Furthermore, there is no need for secondary processing, so processing costs can also be reduced.

In the third to sixth examples of the embodiment, cases of applying the present invention to a column assist type of rack and pinion type power steering apparatus, and a pinion assist type of rack and pinion power steering apparatus were explained, however, the present invention can also be applied to a manual type of rack and pinion steering apparatus.

The present invention is not limited to the construction of the examples of the embodiment described above, and various modifications are possible, and embodiments that are obtained by suitably combining the technological means disclosed are also included within the technical scope of the present invention.

EXPLANATION OF REFERENCE NUMBERS

101 Steering wheel
102 Motor
103, 103a to 103f Steering gear unit
104 Tie rod
105 Column
106 Intermediate shaft
107 Pinion shaft
108 Cylinder section
109 Rack shaft
110 Gear housing
111 Main housing section
112 Sub housing section
10 Pinion-side housing
11 Female threads
12 Column shaped boss
13 Boss section for attachment to the vehicle
131 Installation hole
14 Contact surface
15 Contact surface
16 Cylindrical section
20 Non-pinion-side housing
21 Boss section for attachment to the vehicle
211 Installation hole
30 Intermediate cylindrical section
31 Male threads
32 O-ring
33 Flange section
34 Damper
35 Inner circumferential surface
36 Bearing bushing
37 Bushing holder
40 Rack shaft
41 Solid shaft
411 Outer circumferential surface
412 Ring shaped groove
413 Inner circumferential surface
414 Small-diameter solid section
42 Hollow shaft
421 Inner circumferential surface
422 Right end surface
423 Small-diameter hollow section
424 Large-diameter hollow section
4241 Inner circumferential surface
4242 Right end surface
425 Small-diameter hollow section
426 Outer circumferential surface
43 Convex engagement section
431 Inner circumferential surface
432 Convex section
433 Damper
434 Right end surface
435 Left end surface
44 Weld section
51, 52 Ball joint socket
53, 54 Ball joint boot
55 Band
56 Column shaped boss
57 Bellows
58 Bellows
59 Cylindrical section
60 Cylindrical section
02 Pinion shaft
021 Male threads
022 Pinion
031 Ball bearing
032 Locking nut
033 End cover
034 Ball bearing
041 Lower gear box
042 Bearing hole
043 Female threads
044 Upper gear box
05 Worm reducer
051 Worm wheel
052 Metal core
053 Worm
054 Electric motor
06 Input shaft
061 Ball bearing
062 Pin
063 Torsion bar
064 Bushing
07 Torque sensor
071 Sensor shaft section
072 Yoke
073, 074 Detection coil
08 Rack guide
081 Shaft
082 Needle Bearing
083 Roller
084 Adjustment cover

What is claimed is:

1. A rack and pinion steering gear unit, the unit comprising:
a rack shaft that reciprocates according to rotation of a pinion shaft;
ball joint sockets that are formed on both end of the rack shaft and have a larger diameter than the rack shaft;
a pinion-side housing made of metal that supports a pinion-side end section of the rack shaft where the pinion shaft is located so that sliding movement of the rack shaft is possible, and that can be fastened to a vehicle frame;
a non-pinion-side housing made of metal that supports the non-pinion-side end section of the rack shaft so that sliding movement of the rack shaft is possible, and that can be fastened to the vehicle frame; and
a hollow cylindrical shaped intermediate cylindrical section that is connected to the pinion-side housing on one end, and is connected to the non-pinion-side housing on the other end, and covers the middle section of the rack shaft;
a convex engagement section that is formed in the middle section in the axial direction of the rack shaft between the pinion-side end section and the non-pinion-side end section that is on the opposite side from the pinion-side end section, and that has a larger diameter than the rack shaft so as to move together with the rack shaft, and
as the rack shaft displaces, one of the ball joint sockets that is attached to the pinion-side end section coming in contact with one end of the pinion-side housing, and restricting movement of the rack shaft toward the non-pinion side, and the convex engagement section coming in contact with the other end of the pinion-side housing, and restricting movement of the rack shaft toward the pinion side.

2. The rack and pinion steering gear unit according to claim 1, wherein the non-pinion-side housing supports the non-pinion-side end section of the rack shaft by way of an elastic member so that sliding movement of the rack shaft is possible.

3. The rack and pinion steering gear unit according to claim 1, wherein the rack shaft is formed by connecting a solid shaft on which a rack is formed and a hollow shaft on which the rack is not formed, and the convex engagement section is formed around the connecting section between the solid shaft and the hollow shaft.

4. The rack and pinion steering unit according to claim 1, wherein a damper made of an elastic material is attached to the contact surface of the convex engagement section that comes in contact with the other end of the pinion-side housing.

5. The rack and pinion steering unit according to claim 1, wherein the intermediate cylindrical section can expand and contract in the axial direction of the rack shaft.

6. The rack and pinion steering unit according to claim 1, wherein the material of the intermediate cylindrical section is synthetic resin.

7. The rack and pinion steering unit according to claim 1, wherein the material of the intermediate cylindrical section is rubber.

8. A rack and pinion steering gear unit, the unit comprising:
a rack shaft that reciprocates according to rotation of a pinion shaft;
ball joint sockets that are formed on both end of the rack shaft and have a larger diameter than the rack shaft;
a pinion-side housing made of metal that supports a pinion-side end section of the rack shaft where the pinion shaft is located so that sliding movement of the rack shaft is possible, and that can be fastened to a vehicle frame;
a non-pinion-side housing made of metal that supports the non-pinion-side end section of the rack shaft so that sliding movement of the rack shaft is possible, and that can be fastened to the vehicle frame; and
a hollow cylindrical shaped intermediate cylindrical section that is connected to the pinion-side housing on one end, and is connected to the non-pinion-side housing on the other end, and covers the middle section of the rack shaft;
a convex engagement section that is formed in the middle section in the axial direction of the rack shaft between the pinion-side end section and the non-pinion-side end section that is on the opposite side from the pinion-side end section, and that has a larger diameter than the rack shaft so as to move together with the rack shaft,
the rack shaft supported at two positions of the pinion-side housing and the non-pinion-side housing;
as the rack shaft displaces, one of the ball joint sockets that is attached to the pinion-side end section coming in contact with one end of the pinion-side housing, and restricting movement of the rack shaft toward the non-pinion side, and the convex engagement section coming in contact with the other end of the pinion-side housing, and restricting movement of the rack shaft toward the pinion side.

* * * * *